(12) United States Patent
Supper et al.

(10) Patent No.: US 9,800,083 B1
(45) Date of Patent: Oct. 24, 2017

(54) AUDIO SIGNAL CONVEYING POWER SUPPLY

(71) Applicants: Elijah Alexander Supper, Weatherford, TX (US); William Michael Challancin, Sherrills Ford, NC (US)

(72) Inventors: Elijah Alexander Supper, Weatherford, TX (US); William Michael Challancin, Sherrills Ford, NC (US)

( * ) Notice: Subject to any disclaimer, the term of this patent is extended or adjusted under 35 U.S.C. 154(b) by 0 days.

(21) Appl. No.: 15/256,406

(22) Filed: Sep. 2, 2016

Related U.S. Application Data

(60) Provisional application No. 62/214,280, filed on Sep. 4, 2015.

(51) Int. Cl.
| | |
|---|---|
| *H02J 7/00* | (2006.01) |
| *H02J 7/14* | (2006.01) |
| *H04R 1/10* | (2006.01) |
| *H02J 7/02* | (2016.01) |

(52) U.S. Cl.
CPC .......... *H02J 7/1423* (2013.01); *H02J 7/0021* (2013.01); *H02J 7/0045* (2013.01); *H02J 7/0047* (2013.01); *H02J 7/025* (2013.01); *H04R 1/1025* (2013.01); *H04R 1/1041* (2013.01); *H04R 2420/09* (2013.01)

(58) Field of Classification Search
CPC ................ H04R 1/1025; H04R 1/1041; H04R 2410/09; H04R 2420/09; H02J 7/025; H02J 7/0021; H02J 7/007; H02J 7/1423; H02J 7/0045; H02J 7/0047; H02J 7/00; H02J 1/00

USPC ........................................... 381/74, 385, 386
See application file for complete search history.

(56) References Cited

U.S. PATENT DOCUMENTS

| | | | | |
|---|---|---|---|---|
| 5,587,924 | A | * | 12/1996 | Rossi ..................... H02J 7/0006 320/106 |
| 8,908,389 | B2 | * | 12/2014 | Teetzel ...................... F41H 1/04 2/205 |
| 2008/0317263 | A1 | * | 12/2008 | Villarreal, Jr. ............ A42B 3/30 381/120 |
| 2009/0218884 | A1 | * | 9/2009 | Soar .......................... F41H 1/02 307/11 |
| 2010/0210894 | A1 | * | 8/2010 | Pascual-Leone ........ A61N 2/02 600/14 |
| 2013/0342171 | A1 | * | 12/2013 | Grivas .................... G06F 3/044 320/137 |
| 2015/0070896 | A1 | * | 3/2015 | Chien ..................... F21S 8/035 362/253 |

(Continued)

*Primary Examiner* — Disler Paul
(74) *Attorney, Agent, or Firm* — Rao DeBoer Osterrieder, PLLC; Dileep P. Rao

(57) ABSTRACT

An audio signal conveying power supply configured to provide an output voltage to an electrically powered helmet, an additional audio headset or both. The housing having an audio and power signal inlet port to receive audio signals and power from a vehicle and an audio and power signal outlet port or transmitting audio signals and power to an electrically powered helmet using an independent audio cable connecting between the audio and power signal inlet port to the audio and power signal. A control circuit connected the at the power converted to operate an on/off switch, an active noise reduction switch, a low battery light, a fault light, and a helmet power switch.

19 Claims, 4 Drawing Sheets

(56) References Cited

U.S. PATENT DOCUMENTS

| | | | |
|---|---|---|---|
| 2016/0087455 A1* | 3/2016 | Tanabe | H02J 50/12 307/104 |
| 2016/0244006 A1* | 8/2016 | Challancin | H02J 1/00 |

* cited by examiner

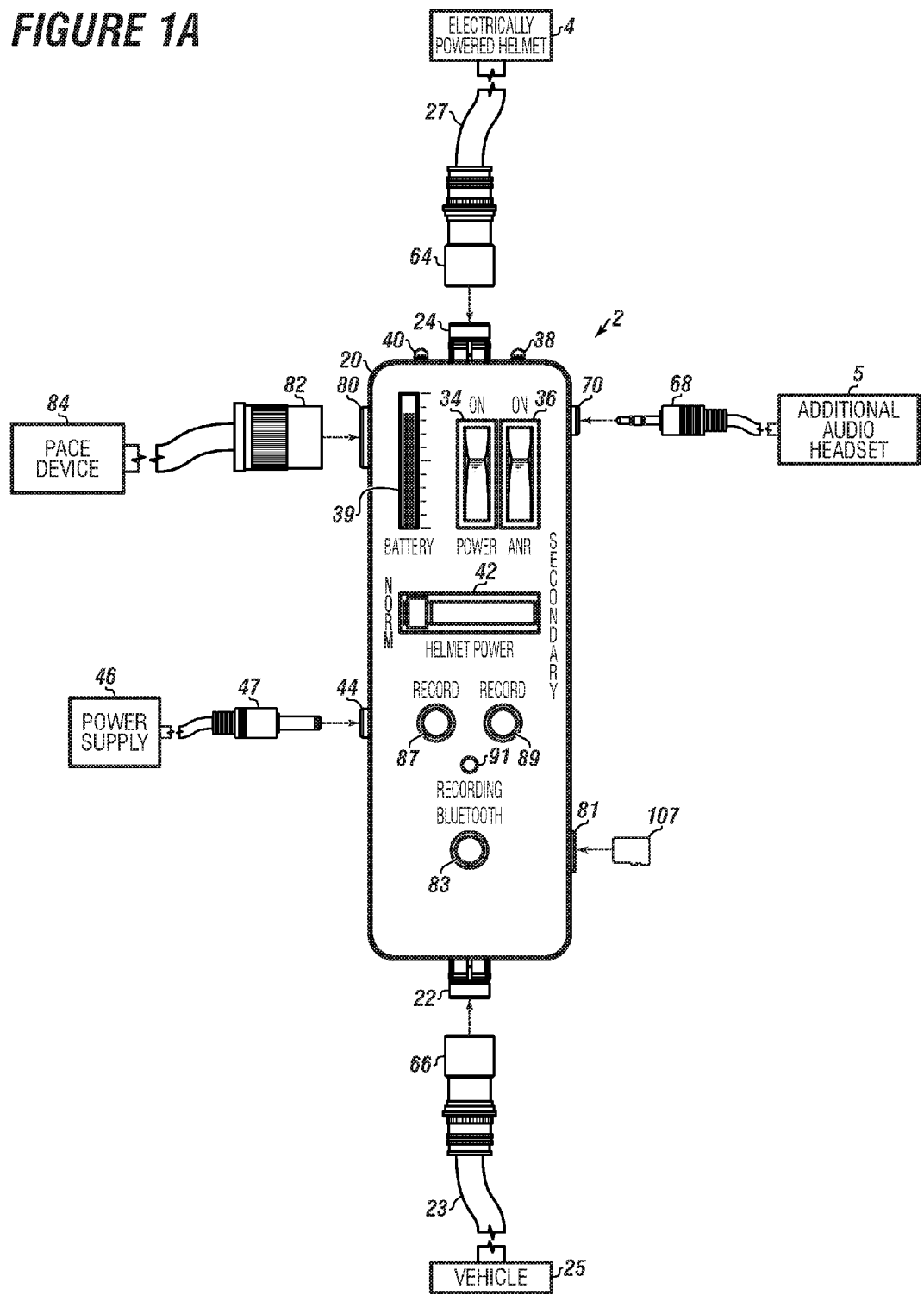

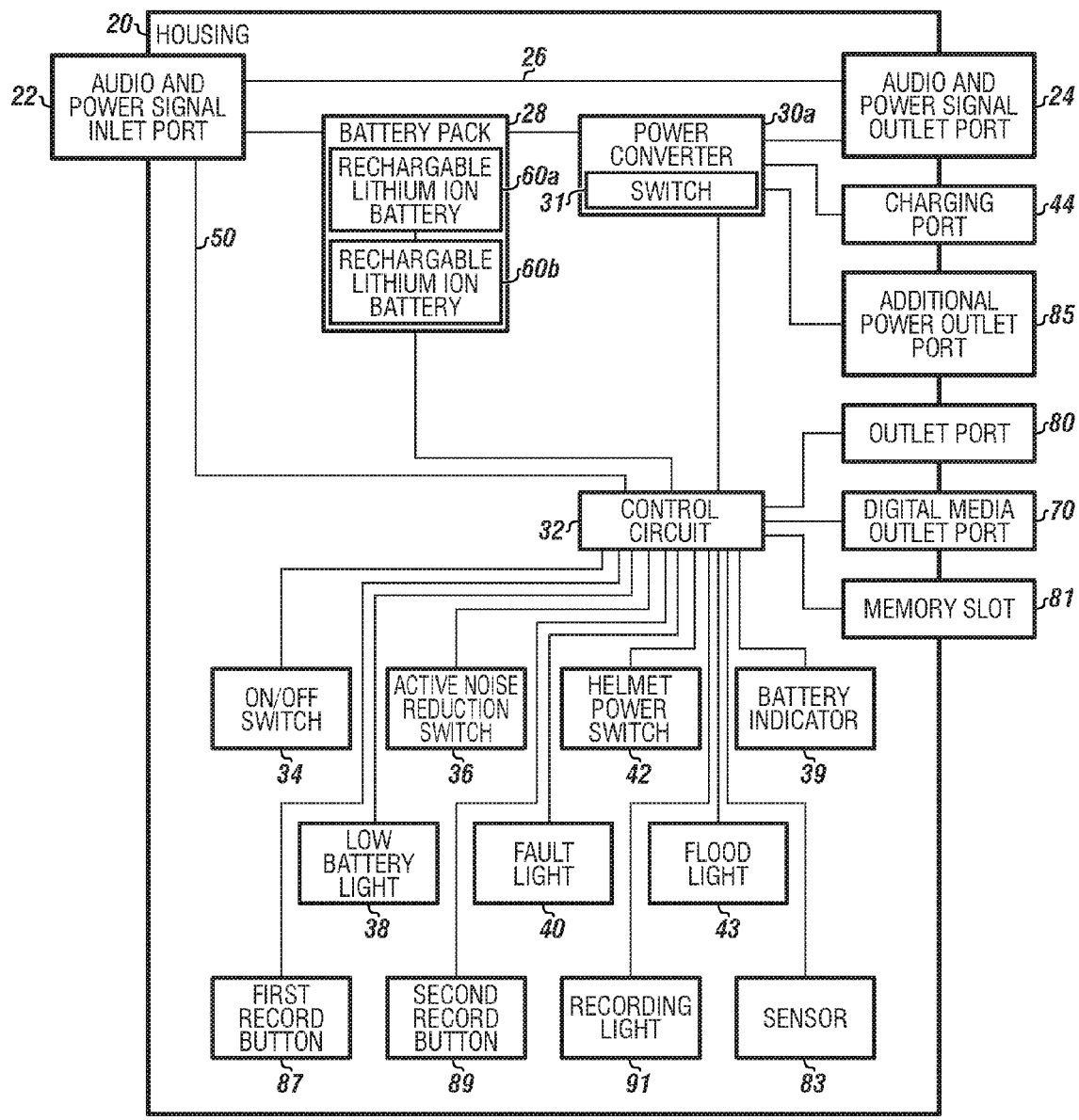

AUDIO SIGNAL CONVEYING POWER SUPPLY

The current application claims priority to and the benefit of U.S. Provisional Patent Application Ser. No. 62/214,280 filed on Sep. 4, 2015, entitled "AUDIO SIGNAL CONVEYING POWER SUPPLY". This reference is incorporated in its entirety herein.

FIELD

The present embodiments generally relate to an audio signal conveying power supply.

BACKGROUND

A need exists for an audio signal conveying power supply for use by pilots or other users that utilize high performance electric powered helmets or headsets, which can be mounted with electric accessories and communications devices.

A further need exists for a power supply that can activate and convey transmissions from an aircraft or vehicle while powering the helmets or headsets when the vehicle power supply is unavailable, the user exits the vehicle, or the power supply from the vehicle is cut or fails.

A need exists to increase the component run times and reliability of the helmets or headsets without increasing the helmet or headset weight due to additional helmet or headset mounted battery packs.

The present embodiments meet these needs.

BRIEF DESCRIPTION OF THE DRAWINGS

The detailed description will be better understood in conjunction with the accompanying drawings as follows:

FIG. 1A depicts a front view of the audio signal conveying power supply according to one or more embodiments.

FIG. 1B depicts a diagram of an audio signal conveying power supply according to one or more embodiments.

Figure 2A:
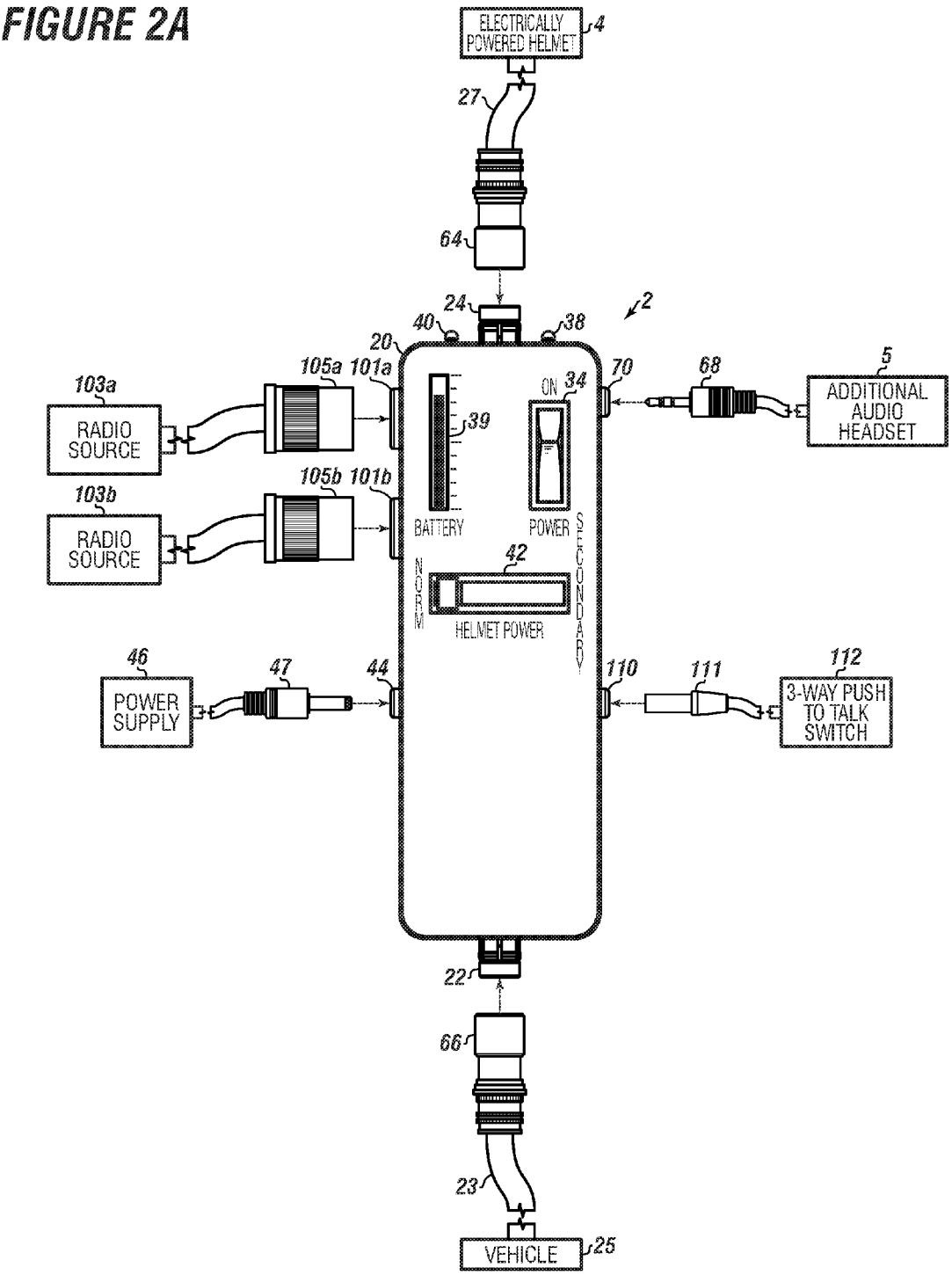
FIG. 2A depicts a front view of the audio signal conveying power supply according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to an audio signal conveying power supply.

A benefit of the audio conveying power supply is that it offers a level of redundant power for an individual pilot helmet.

In embodiments, the audio conveying power supply can be a portable, wearable, rechargeable DC power supply invented to power helmet mounted accessories in civilian flight helmets.

The device can power pilot rescue radios in an emergency.

In embodiments, the device can use two 24 volt lithium ion batteries, which can provide redundancy and emergency mode protection with up to double digit hours of continuous operation of night vision goggles, active noise reduction, and boom or oxygen mask mounted lip lights.

The device can connect to a vehicle, such as an aircraft, using a low impedance connection.

These embodiments can enhance the safety of the user as it can allow the user to remove unwanted weight from the helmet or headset, while simultaneously increasing electrical component run times of helmet or headset mounted equipment.

The embodiments can monitor the audio coming from a vehicle and can supply low voltage to power a noise reduction device. In the noise reduction mode, audio is conveyed in the ear cups of the helmet or headset to improve the health and safety for individual users.

The device can provide an alarm when the battery supply is low. The device can also provide alternative lighting in the cockpit for a pilot or driver with an electrically powered helmet.

The embodiments further relate to an audio signal conveying power supply that can be configured to provide an output voltage to an electrically powered helmet and an additional audio headset while simultaneously conveying audio signals.

In embodiments, the audio signal conveying power supply can be wearable and portable.

The audio signal conveying power supply can connect directly to a helmet with a set of connected custom cables that can provide right and left audio to ear buds, a strain relief cord, an electrical cable to a lip light, an audio cable to a boom microphone, a voltage to night vision goggles, and combinations thereof.

In embodiments, the wearable portable audio and power conveying device can have a housing with an audio and power signal inlet port to receive audio signals from a vehicle or a ground pack.

A ground version of the device, that is a ground based version, which is not attached to a vehicle, can act the same as a vehicle version but be connected to a ground based unit. Ground based operators can plug their communication device into the bottom of the housing and other equipment on their helmets and shoulder cameras can be powered by the audio signal conveying power device. The device can provide secondary power to communication equipment if needed when primary power supplies are interrupted. In embodiments, the secondary power can be emergency power.

The device can use a dual general aviation high impedance in a cable, a panel mounted multi-pin jack to provide microphone input and provide DC power, as well as a multi-pin cord that can provide audio input and DC power simultaneously.

The top quick disconnect and the bottom quick disconnect can be configured to be mated together without the power supply being present. This configuration can allow continued transmission of audio from the vehicle to the helmet or headset in the event of power supply damage or failure.

The housing can have an audio and power signal outlet port for transmitting audio signals and power to the electrically powered helmet.

An independent audio cable can be in the housing and can connect between the audio and power signal inlet port to the audio and power signal outlet port, as well as a battery pack, a plurality of power converters, and a control circuit. In embodiments, additional components can be installed, such as power regulators, step down voltage components, and an optional memory disk port.

The control circuit can control an on/off switch, an active noise reduction switch, a low battery light, a fault light, a helmet power switch, a charging port, a plurality of radio communication ports, a three way push to talk port, and combinations thereof.

In embodiments, the audio signal conveying power supply can have a connection for a BLUETOOTH™ operation or support a man-worn local area network that can use a variety of infrared light pulses and or radio frequency pulses to send encrypted data, such as audio, from the helmet or headset to a radio matrix.

Turning now to the Figures, FIG. 1A depicts a front view of the audio signal conveying power supply according to one or more embodiments.

The audio signal conveying power supply 2 can be configured to simultaneously provide an output voltage to an electrically powered helmet 4 and an additional audio headset 5, which in embodiments can be a digital video recorder.

The audio signal conveying power supply 2 can have a housing 20. In embodiments, the housing can be made from plastic that can be "IP-67" compliant and impact resistant, to 100 pounds per square inch (psi) durable and water resistant.

The term "IP-67" as used herein can refer to a rating developed by the US military that means the device is resistant against water ingress to a maximum of 1 meter of water for up to 30 minutes as well as being resistant against dust ingress at ambient pressures. The IP-67 rating is based on the IEC standard 60529, sometimes interpreted as Ingress Protection Marking.

In embodiments, the housing can be 6 inches long, 5 inches wide and 3 inches deep. The housing can be curved or slightly flexible to be ergonomic for a wearer.

In embodiments, the housing can have various ports, such as an audio and power signal inlet port 22, which can simultaneously receive audio signals and optional power from a vehicle audio and power cable 23 when connected to a vehicle 25.

The audio and power signal inlet port 22 can be engaged with the vehicle audio and power cable 23 using a bottom quick disconnect 66 between the vehicle audio and power cable 23 and the housing 20. The bottom quick disconnect 66 can be used for emergency release and connection. In embodiments, the vehicle audio and power cable 23 can be a low impedance cable.

The vehicle can be an aircraft, a boat, a rotorcraft, a helicopter, a space exploration vehicle, a train, an all-terrain vehicle, a motorcycle, a car or another electrical producing form of transport. In embodiments, the vehicle can be replaced with a ground pack that requires power and communication attached to an individual.

The housing can also have an audio and power signal outlet port 24, which can be used for transmitting audio signals and power to an audio and power cable 27, which can be connected to the electrically powered helmet 4.

The audio and power cable 27 can provide the multiple functions, such as (i) providing audio to ear buds, both left and right ear buds, (ii) providing power to a lip light, (iii) receiving audio from a boom mic, and (iv) recording video from a shoulder mounted camera on the individual operator or wearer, which can be done simultaneously.

The bidirectional feed of both audio and low voltage power is a significant feature of the invention.

A top quick disconnect 64 can be used to connect between the audio and power cable 27 and the audio and power signal outlet port 24 for emergency release and connection.

In embodiments, the power to the electrically powered helmet, the additional audio headset, a DVR, or combinations thereof can transfer through the audio signal conveying power supply via the vehicle audio and power cable 23.

In the event of a power failure from the vehicle, the audio signal conveying power supply can stand alone, that is, the battery pack in the housing can continue to power the electrically powered helmet of a pilot, plus additional features of the invention, such as a camera and lights.

The audio signal conveying power supply can be particularly useful for a pilot of a jet aircraft.

A charging port 44 can be formed in the housing 20 and configured to accept power from a power supply 46, which in embodiments; can be separate from the vehicle 25. In embodiments, the power supply can charge the battery pack. In embodiments, the charging can be done wirelessly.

In embodiments, the charging port 44 can be configured to accept from 10 volts to 32 volts of DC power or from 100 volts to 240 volts of AC power to charge the battery pack. The charging port can accept a variety of DC and AC voltages to provide a trickle charge.

A quick disconnect 47 can be used for engaging the power supply 46 and the charging port 44.

A digital media outlet port 70 can be formed in the housing 20, which can engage an audio plug 68, which can be connected to the additional audio headset 5. In embodiments, the additional audio headset can be ear buds worn inside the electrically powered helmet or a recorder, such as a digital video recorder.

If a recorder is used instead of the additional audio headset, then a first record button 87 can be installed on the housing 20 to activate recording to the recorder.

The digital media outlet port 70 can transfer audio signals, video signals, still signals, or combinations thereof to either the additional audio headset or to the recorder.

The additional audio headset 5 can receive additional signals different from signals to the electrically powered helmet 4, such as sound cancelling signals to protect a pilot's ears and overall health during missions.

In embodiments, an outlet port 80 can be configured to accept custom or non-custom ear plugs that contain microspeakers that are capable of delivering mono, stereo or spatial 3D sound.

In embodiments, the outlet port 80 can be configured to accept a pace plug 82 connected to a pace device 84, such as custom ear buds.

Additional outlet ports can be used with the device, such as a memory slot 81, such as an optional solid state micro secure digital slot, which as used herein can refer to a small expansion slot in portable devices that can increase the available memory via insertion of a MicroSD card, or a nonvolatile memory card.

If a memory slot 81 is used, a second record button 89 can be used. When pressed, the second record button 89 can record audio from a helmet operator, and if the helmet operator has a helmet mounted camera or body mounted camera, the memory slot can be used to record from the camera to a memory storage device 107, which can be located in the memory slot 81.

A recording light 91 can be connected to the memory slot 81, which can illuminate when the memory storage device 107 is recording and the function is being used.

When the housing 20 is configured with BLUETOOTH™, a sensor 83 can act as an on/off button activating a BLUEETOOTH™, wired or wireless connection while simultaneously providing illumination from the battery pack clearly displaying that connectivity has been established.

The sensor 83 can provide the status that the device is paired or is searching. The illumination can indicate the status of the device, such as that connectivity has occurred or that the device is searching for a paired device The sensor 83, when held, can activate the pairing process. When held again, the depressible button can drop the connectivity.

Data can be in the form of audio alters, voice texts, data packets, and encrypted signals which can be translated inside the audio signal conveying power supply and delivered into the operator's headset and or the ear buds if used.

An on/off switch 34 can be mounted to the housing 20, which can be used for switching the audio signal conveying power supply on and off.

An active noise reduction switch 36 (ANR) can also be mounted to the housing 20, which can transmit low voltage to a noise suppression device installed in the helmet or headset.

A low battery light 38 and a fault light 40 can be used and can be illuminated by a control circuit, which can be located inside the housing.

In embodiments, a battery indicator 39, showing the charge remaining, and a helmet power switch 42 can be located into the housing.

FIG. 1B depicts a diagram of an audio signal conveying power supply according to one or more embodiments.

An independent audio cable 26 can be located in the housing 20 and can connect from the audio and power signal inlet port 22 to the audio and power signal outlet port 24 enabling continuous audio feed from the vehicle to the electrically powered helmet.

The housing 20 can have a battery pack 28 electrically connected to the audio and power signal outlet port 24.

The battery pack 28 is depicted as a pair of rechargeable lithium ion batteries 60a and 60b. In embodiments, the lithium ion batteries can be connected in parallel.

The housing 20 can have at least one power converter 30a, which can be coupled between the battery pack 28 and the audio and power signal outlet port 24.

The at least one power converter 30a can have a switch 31. The switch 31 can be operable at a variable switching frequency to provide from 2.2 volts to 18 volts to the audio and power signal outlet port 24. The power can be direct current (DC) or another current can be used, such as alternating current (AC).

In embodiments, a plurality of power converters can be used, wherein each of the power converters can supply the same amount of volts or different amounts of volts to the different devices connected to the housing.

In an embodiment, one of the power converters can supply 2.2 volts to 18 volts to the electrically powered helmet while another power converter can supply voltage to a lip light on the helmet or another lighting device. In an embodiment, the device can provide multiple voltage outputs which are simultaneously available at values between 2.0 volts and 18 volts depending on the application. At times one output channel can be internally adjustable via voltage selection dip switches.

In embodiments, the at least one power converter can supply 6 volts of power to the electrically powered helmet or the additional audio headset.

The housing 20 can have a control circuit 32, which can be connected to the at least one power converter 30a, the on/off switch 34, the active noise reduction switch 36, the low battery light 38, the battery indicator 39, the fault light 40, the helmet power switch 42 and a flood light 43. The flood light 43 can be an light emitting diode "LED", which can be on the housing powered by the battery back. The flood light can be a multicolored night vision light. The flood light can have an on/off switch for operating with the battery pack.

The memory slot 81 and an additional power outlet port 85 can be connected to the control circuit 32. The additional power outlet port 85 can be used to charge a device or consumer electronics, such as a cellular phone, a smart device, a tablet computer or the like.

In embodiments, the outlet port 80 can be configured to accept custom or non-custom ear plugs.

The control circuit 32 can also be in communication with the first record button 87, the second record button 89, the recording light 91 and the sensor 83.

A multi-volt power cord 50 can be in the housing and connected between the audio and power signal inlet port 22 and the control circuit 32.

The control circuit 32 can be configured to provide different voltages simultaneously to the battery pack 28, the at least one power converter 30a, the lights, and the battery indicator 39. The housing can simultaneously convey an audio signal from the audio and power signal inlet port 22 to the electrically powered helmet.

The charging port 44 can be formed in the housing and configured to accept power of the power supply or from the vehicle to charge the battery pack 28.

The most important aspect of one of the embodiments is that the control circuit 32 does not hinder the audio transmission from the vehicle to the electrically powered helmet.

A digital media outlet port 70 can be formed in the housing 20 to engage the audio plug that can connect to the additional audio headset.

The control circuit 32 can be configured to perform a variety of activities, which can be done one at a time or all simultaneously.

The control circuit 32 can turn on or off the audio signal conveying power supply when the on/off switch 34 is activated.

The control circuit 32 can open or close the active noise reduction switch 36.

The control circuit 32 can activate the low battery light 38 when the battery pack has a low battery.

The control circuit 32 can activate the fault light 40 when the battery pack has a fault within the housing.

The control circuit 32 can open or close the helmet power switch 42 to change operational mode of the battery pack from primary power (from the vehicle or ground pack) to secondary power of the audio signal conveying power supply.

In embodiments, the at least one power converter can provide voltage to operate at least one light, such as the low battery light, the fault light, the flood light, or combinations thereof, which can be simultaneously.

FIG. 2A depicts a front view of the audio signal conveying power supply according to one or more embodiments.

The audio signal conveying power supply 2 can be configured to provide an output voltage to the electrically powered helmet 4 and the additional audio headset 5.

The housing 20 can have the audio and power signal inlet port 22 for receiving audio signals and optional power from the vehicle audio and power cable 23, which can be connected to the vehicle 25. The audio and power signal inlet port 22 can be engaged with the vehicle audio and power cable 23 using the bottom quick disconnect 66, which can be between the vehicle audio and power cable 23 and the housing 20. The bottom quick disconnect can be for emergency release and connection.

The audio and power signal outlet port 24 for transmitting audio signals and power to the audio and power cable 27 can be connected to the electrically powered helmet 4.

The top quick disconnect 64 can engage between the audio and power cable 27 and the housing 20 for emergency release and connection.

The housing 20 can also contain the on/off switch 34, the battery indicator 39, the fault light 40 and the helmet power switch 42

The charging port 44 is shown and can be configured to accept power from the power supply 46 to charge a battery pack in the housing using the quick disconnect 47 for engaging between the power supply 46 and the charging port 44.

The digital media outlet port 70 is shown in the housing 20. The digital media outlet port 70 can engage the audio plug 68, which can be connected to the additional audio headset 5 or an additional recording device.

The additional recording device can be any device that records audio or video. The additional recording device can be an electric device that can record when a button is pressed and stop recording when the pressed button is released. The recording device can be a digital voice recorder.

A plurality of radio communication ports 101a and 101b are depicted. In embodiments, each radio communication port 101a and 101b can engage a radio source 103a and 103b respectively.

Each radio source can connect to one of the radio communication ports using a quick connect plug 105a and 105b.

In embodiments, the housing 20 can have a three way push to talk port 110.

The three way push to talk port 110 can engage a three way push to talk switch 112. The three way push to talk switch 112 is shown connected to the three way push to talk port 110 with a three way quick disconnect 111.

Figure 2B:
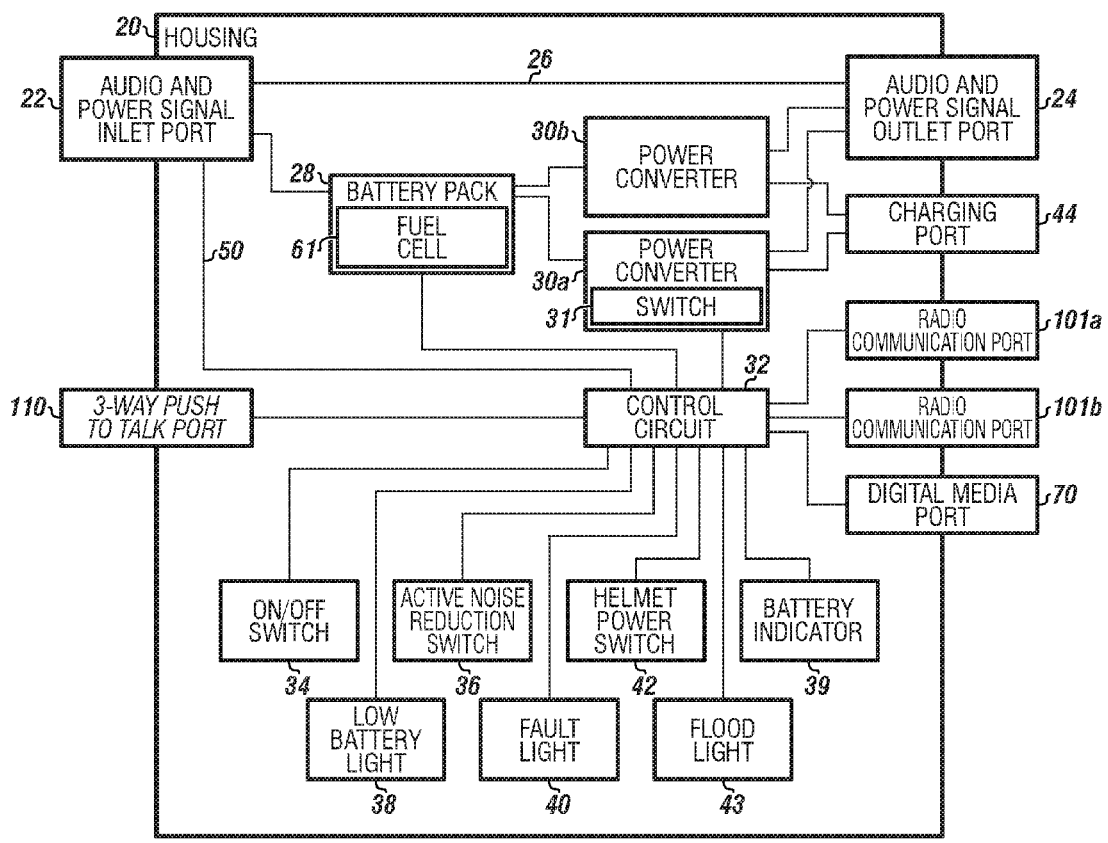
FIG. 2B depicts a diagram of the audio signal conveying power supply according to one or more embodiments.

FIG. 2B depicts a diagram of the audio signal conveying power supply according to one or more embodiments.

The audio and power signal inlet port 22 is shown connected to the audio and power signal outlet port 24 using the independent audio cable 26 in the housing 20.

In this embodiment, the battery pack 28 can contain a fuel cell 61.

The multi-volt power cord 50 can connect between the audio and power signal inlet port 22 and the control circuit 32.

In this embodiment, a plurality of power converters 30a and 30b are depicted in the housing 20.

At least one power converter from the plurality of power converters 30a and 30b can supply from 2.0 volts to 18 volts to the electrically powered helmet, the additional audio headset, or both. The additional audio headset can be a digital recording device, one of the lights, or switches, and at least one power converter supplies 6 volts of power to the electrically powered helmet or additional audio headset.

Power converter 30a is shown having a switch 31 for changing voltages and providing current to certain outlets.

The switch 31 can be operable at a variable switching frequency to provide at least 3.5 volts and 9 volts to the audio and power signal outlet port 24.

The control circuit 32 can be connected to the plurality of power converters 30a and 30b, the on/off switch 34, the active noise reduction switch 36, the low battery light 38, the battery indicator 39, the fault light 40, the helmet power switch 42, and the flood light 43.

In embodiments, other devices can connect to the housing 20 or to the audio and power cable. These other devices can include night vision devices/goggles (NVDs), shoulder mounted cameras, electronic stethoscopes, and or any other device applicable to the invention.

The control circuit can send different voltages for the lip light, night vision device (NVD) and active noise reduction (ANR).

The control circuit 32 is also shown in communication with the three way push to talk port 110.

The control circuit 32 can communicate with the digital media outlet port 70 and the plurality of radio communication ports 101a and 101b. In embodiments, each radio communication port can engage a radio source 103a and 103b.

The charging port 44 can be in communication with the plurality of power converters 30a and 30b.

The control circuit can be configured to turn on or off switches and lights as indicated.

While these embodiments have been described with emphasis on the embodiments, it should be understood that within the scope of the appended claims, the embodiments might be practiced other than as specifically described herein.

What is claimed is:

1. An audio signal conveying power supply configured to provide an output voltage to an electrically powered helmet and an additional audio headset, the audio signal conveying power supply comprising:
   a. a housing;
   b. an audio and power signal inlet port in the housing for receiving audio signals, power, or both audio signals and power from a vehicle audio and power cable connected to a vehicle;
   c. an audio and power signal outlet port in the housing for transmitting the audio signals, power, or both audio signals and power to an audio and power cable connected to the electrically powered helmet;
   d. an independent audio cable in the housing connecting from the audio and power signal inlet port to the audio and power signal outlet port;
   e. a battery pack in the housing electrically connected to the audio and power signal outlet port;
   f. at least one power converter in the housing coupled between the battery pack and the audio and power signal outlet port;
   g. a control circuit connected to the at least one power converter, an on/off switch, an active noise reduction switch, a low battery light, a fault light, and a helmet power switch, the control circuit configured to:
      i. turn on or off the audio signal conveying power supply when the on/off switch is activated;
      ii. open or close the active noise reduction switch;
      iii. activate the low battery light when the battery pack has a low battery;
      iv. activate the fault light when the battery pack has a fault within the housing; and
      v. open or close the helmet power switch to change operational mode of the battery pack from a primary power to a secondary power and transfer power from the vehicle to the battery pack; and
   h. a charging port formed in the housing configured to accept power from a power supply or from the vehicle to charge the battery pack in the audio signal conveying power supply.

2. The audio signal conveying power supply of claim 1, comprising a flood light mounted to the housing and connected to the control circuit.

3. The audio signal conveying power supply of claim 1, comprising a multi-volt power cord connected between the audio and power signal inlet port to the battery pack and the control circuit adapted to provide different voltages simultaneously to the battery pack and the at least one power converter while the housing simultaneously conveys an audio signal from the audio and power signal inlet port to the electrically powered helmet and the additional audio headset.

4. The audio signal conveying power supply of claim 2, wherein the at least one power converter provides a voltage to operate the low battery light, the fault light and the flood light.

5. The audio signal conveying power supply of claim 1, wherein the at least one power converter having at least one switch operable at a variable switching frequency to provide at least 2.2 volts to 18 volts to the audio and power signal outlet port.

6. The audio signal conveying power supply of claim 1, wherein the vehicle is an aircraft, boat, a motorcycle, a car, an electrical producing form of transport or a ground pack.

7. The audio signal conveying power supply of claim 1, wherein the battery pack comprises a pair of rechargeable lithium ion batteries, wherein each of the rechargeable lithium ion batteries are connected in parallel.

8. The audio signal conveying power supply of claim 1, wherein the battery pack is a fuel cell.

9. The audio signal conveying power supply of claim 1, comprising a top quick disconnect engaging between the audio and power cable and the housing for emergency release and connection.

10. The audio signal conveying power supply of claim 1, comprising a bottom quick disconnect engaging between the vehicle audio and power cable and the housing for emergency release and connection.

11. The audio signal conveying power supply of claim 1, wherein the charging port is configured to accept from 10 volts to 32 volts or from 100 volts to 240 volts of power to charge the battery pack.

12. The audio signal conveying power supply of claim 1, wherein the at least one power converter comprises a plurality of power converters with the at least one power converter supplying 3.5 volts to the electrically powered helmet or the additional audio headset, and the at least one power converter supplying 6 volts of power to the electrically powered helmet or the additional audio headset.

13. The audio signal conveying power supply of claim 1, comprising an audio plug connected to the additional audio headset, the audio plug for engaging a digital media outlet port connected to the independent audio cable.

14. The audio signal conveying power supply of claim 1, comprising a quick disconnect for engaging between the power supply and the charging port.

15. The audio signal conveying power supply of claim 1, comprising an outlet port connected to the independent audio cable, the outlet port configured to accept a pace plug connected to a pace device or custom ear buds.

16. The audio signal conveying power supply of claim 1, comprising a battery indicator installed in the housing connected to the control circuit.

17. The audio signal conveying power supply of claim 1, comprising a memory slot and at least one record button that when the at least one record button is pressed, audio or video is recorded to a removable memory storage device.

18. The audio signal conveying power supply of claim 1, comprising a sensor that acts as an on/off button and provides illumination from the battery pack indicating status that connectivity has occurred or is searching for a paired device.

19. An audio signal conveying power supply configured to provide an output voltage to an electrically powered helmet and an additional audio headset, the audio signal conveying power supply comprising:
   a. a housing;
   b. an audio and power signal inlet port in the housing for receiving audio signals power, or both audio signals and power from a vehicle audio and power cable connected to a vehicle;
   c. an audio and power signal outlet port in the housing for transmitting the audio signals, power, or both audio signals and power to an audio and power cable connected to the electrically powered helmet;
   d. an independent audio cable in the housing connecting from the audio and power signal inlet port to the audio and power signal outlet port;
   e. a battery pack in the housing electrically connected to the audio and power signal outlet port;
   f. a plurality of power converters in the housing coupled between the battery pack and the audio and power signal outlet port, wherein at least one power converter of the plurality of power converters having at least one switch operable at a variable switching frequency to provide at least 2.2 volts to 9 volts simultaneously to the audio and power signal outlet port, an additional power converter connected between the battery pack and the audio and power signal outlet port;
   g. a control circuit connected to the plurality of power converters, the control circuit configured to control an on/off switch, an active noise reduction switch, a low battery light, a fault light, and a helmet power switch, the control circuit configured to:
      i. turn on or off the audio signal conveying power supply when the on/off switch is activated;
      ii. open or close the active noise reduction switch;
      iii. activate the low battery light when the battery pack has a low battery;
      iv. activate the fault light when the battery pack has a fault within the housing; and
      v. open or close the helmet power switch to change operational mode of the battery pack from a primary to a secondary power and transferring power from the vehicle to the battery pack;
   h. a charging port formed in the housing configured to accept power from a power supply or from the vehicle to charge the battery pack;
   i. a plurality of radio communication ports, each of the radio communication port of the plurality of radio communication ports engaging a radio source via a quick connect plug; and
   j. a three way push to talk port engaging a three way push to talk switch, the three way push to talk switch connected with a three way quick disconnect.

* * * * *